United States Patent
Raimbault et al.

[11] Patent Number: 5,808,550
[45] Date of Patent: Sep. 15, 1998

[54] POWER AND MODULATION CIRCUIT FOR A REMOTELY-POLLABLE ELECTRONIC TAG

[75] Inventors: Pierre Raimbault, 9 Rue Portalis, 75008 Paris; Jean Goupil, Paris; Aderito Rodrigue, Caen, all of France

[73] Assignee: Pierre Raimbault, Paris, France

[21] Appl. No.: 757,470

[22] Filed: Nov. 27, 1996

[30] Foreign Application Priority Data

Dec. 1, 1995 [FR] France .................................. 95 14253

[51] Int. Cl.$^6$ .................................................. G08B 13/14
[52] U.S. Cl. ...................... 340/572; 340/825.54; 340/693
[58] Field of Search ............................ 340/572, 825.54, 340/693

[56] References Cited

U.S. PATENT DOCUMENTS

| | | | |
|---|---|---|---|
| 4,196,418 | 4/1980 | Kip et al. ............................ | 340/825.54 |
| 5,103,222 | 4/1992 | Hogen Esch et al. ............. | 340/825.54 |
| 5,105,190 | 4/1992 | Kip et al. ............................ | 340/825.54 |
| 5,317,330 | 5/1994 | Everett et al. ...................... | 340/572 |
| 5,471,196 | 11/1995 | Pilested ............................... | 340/572 |
| 5,491,468 | 2/1996 | Everett et al. ...................... | 340/572 |

FOREIGN PATENT DOCUMENTS

| | | |
|---|---|---|
| 0 242 906 A1 | 10/1987 | European Pat. Off. . |
| 0 405 695 A1 | 1/1991 | European Pat. Off. . |
| 0 592 224 A1 | 4/1994 | European Pat. Off. . |
| WO 95/00922 | 1/1995 | WIPO . |

*Primary Examiner*—Jeffery A. Hofsass
*Assistant Examiner*—Sihong Huang
*Attorney, Agent, or Firm*—Fish & Richardson P.C.

[57] ABSTRACT

A power and modulation circuit, notably for a passive remotely-pollable electronic tag is provided, the circuit having a coil for picking up an inductive field and modulating it, circuitry being provided whereby circuits of the tag can be continuously powered while the inductive field is being modulated.

19 Claims, 2 Drawing Sheets

POWER AND MODULATION CIRCUIT FOR A REMOTELY-POLLABLE ELECTRONIC TAG

BACKGROUND OF THE INVENTION

This invention relates to a power and modulation circuit, notably for an electronic tag (also known as a radio tag) able to be polled or interrogated from a remote point. It also relates to the tag able to be remotely polled, provided with such a circuit.

The invention generally relates to the field of interrogating electronic tags remotely from an inquiry station or exit gate or the like. Numerous applications are possible, in widely-ranging field. The following can be given as examples:

checking, checking out and/or verifying electronically-tagged articles purchased by supermarkets customers;

counting of tagged objects for stock management in a factory or industrial plant;

recognizing and orienting tagged objects such as, for example, suitcases in an airport;

recognizing the passage of objects fitted with tags, such as for example automobiles at a pay station, and exchange of information with such objects;

in systems for restricting access or for monitoring access of persons carrying an electronic tag to an installation or site, etc.

Other applications are possible.

In the remainder of this specification, the term "tag" will simply be used to designate an electronic tag, independently of its physical support or use.

The term "gate" or "station" will generally be used for the station from which tags are polled; the physical form of this station is obviously not limited to the physical structure of a frame or gate.

Generally speaking, for remote interrogation of tags, the tags will have the following functionalities: possibility to remotely communicate with the station both in send and receive mode; preservation of an optionally reprogrammable code; generation of responses by the tag as a function of questions received from the station. In many applications, it is additionally useful when the tags employ the field generated by the station as a source of power: remote powering of this kind avoids using a power supply in the tag, thus reducing its size and cost.

Below, the term "reception" will be used to mean reception by the tag of signals supplied by the station and the term "send" should be taken to mean transmission of signals to the station from the tag.

This present invention specifically concerns remote communication functionalities with the station, in send mode, and remote tag powering. More precisely, the invention provides a power and modulation circuit for a tag able to be polled or interrogated remotely.

Various solution have already been proposed for remotely powering tags and allowing them to communicate remotely with a station.

European Patent application EP-A-0,242,906 discloses various solutions to this problem, comprising the use of a single coil for remote powering, reception and transmission. A first proposed solution consists in rectifying the voltage from a coil using a diode, and filtering this voltage with a capacitor for obtaining a DC power supply. In send mode, the coil is short circuited, generating variations in flux, which can be detected by the station.

The disadvantages of this solution are as follows. Firstly, there is no boosting of the voltage at the coil terminals, meaning that the circuit can only operate in a powerful inductive field. Secondly, during sending or transmission, the rectifying circuit receives no power and the signal received cannot be used as a clock signal.

A second solution disclosed in this same document, or also in European Patent application EP-A-0,405,695 consists in using a parallel resonant circuit comprising a coil and a tuning capacitor; means are connected to this circuit for providing power and modifying the characteristics of the resonant circuit in send mode. Such means typically comprise a rectifier such as diode and a capacitor. Like the case of the first solution, the coil is short circuited in send mode.

This solution has the following disadvantages:

the presence of other tags in the vicinity detunes the resonant circuit, reducing its Q factor;

beat frequencies are generated between the inductive field frequency and the tuned frequency, interfering with the tag reception circuits;

tuning of the inductance increases the current passing therethrough, making it more difficult to detect the current generated by shorting it, when a tag is sending a response;

like the case of the first solution, no power is supplied to the rectifier circuit while the tag is sending and the signal received cannot be used as a clock signal.

FIGS. 1 and 2 show known circuits of this type.

European patent application 0,592,224 discloses a system for remotely interogating RF tags, the latter having a parallel resonant LC circuit. It is stated that a second capacitor is connected in series with the parallel resonant circuit. The combined circuit is connected to the transmitter. This type of circuit is only suitable for systems in which energy is accumulated, the tags accumulating power over the major part of a duty cycle, and only responding with brief bursts. It is obvious that the tag disclosed in this document is not suitable for systems in which the tag is required to send over an extended period and needs to maintain a voltage that is sufficient for the logic circuits controlling sending.

SUMMARY OF THE INVENTION

The invention sets out to overcome these disadvantages. It makes it possible to obtain more energy for circuit powering; it also makes it possible to continue to power the tag circuits while the tag is sending, and a clock signal generated by signals received from the station can even be employed while the response is being sent.

Thus, the invention provides a power supply and modulation circuit, notably for a remotely-pollable tag, comprising:

coil means for picking up an inductive field and modulating said field;

means for constituting a series resonant LC circuit with said coil means in the absence of modulation;

means for constituting a parallel resonant LC circuit with said coil means for modulating said inductive field;

means for rectifying a voltage induced by said inductive field in said coil means for providing a power supply voltage.

In a preferred embodiment, the series resonant LC circuit and the parallel resonant LC circuit have the same resonant frequency. This resonant frequency is preferably the frequency of said inductive field.

In one embodiment, the means for constituting a series resonant LC circuit and said means for constituting a parallel resonant LC circuit comprise a common capacitor.

According to another preferred embodiment the means for rectifying an induced voltage comprise first rectifying means connected across the terminals of said series resonant LC circuit formed by said means for constituting a series resonant LC circuit in the absence of modulation.

According to another preferred embodiment the means for rectifying an induced voltage comprise second rectifying means connected across the terminals of said parallel resonant LC circuit formed by the means for constituting a parallel resonant LC circuit for modulating said inductive field.

According to a preferred embodiment said rectifying means comprise a voltage doubler circuit.

The invention also provides a power supply and modulation circuit, notably for a remotely-pollable tag, comprising:

coil means, a capacitor one end of which is connected to a first terminal of said coil means;

switching means provided between another end of said coil means and another terminal of said capacitor for constituting a parallel LC circuit providing modulation when said switching means are closed;

and a circuit for rectifying a voltage in said coil means, for providing a supply voltage, connected to a second terminal of said coil means and a second terminal of said capacitor.

According to a preferred embodiment of this circuit, the rectifying circuit includes switching means capable of being opened for modulation.

The circuit advantageously comprises rectifying means connected across the terminals of said coil means, and active when said switching means are closed.

In one embodiment, the circuit includes rectifying means connected across the terminals of said coil means, and active when said switching means are closed.

The invention finally provides a remotely-pollable tag provided with this power supply and modulation circuit.

Further advantages and characteristics of the invention will become more clear from the description that follows of various embodiments provided by way of example only, and with reference to the attached drawings.

BRIEF DESCRIPTION OF THE DRAWINGS

FIG. 1 is a circuit diagram of a first known power and modulation circuit, such as the one shown in FIG. 2 of EP-A-0,242,906.

This circuit comprises a coil or winding L1 able to be short-circuited by a transistor SW1 in send mode. One end of coil L1 is grounded and the other end is connected to a rectifier diode D1. One end of a capacitor C1 is grounded and the other is connected to the other terminal of the diode. A rectified and filtered power supply voltage Valim is obtained at the point of connection between diode D1 and capacitor C1.

The means for switching transistor SW1, which are powered by voltage Valim, are not shown, nor are the means for evaluating the voltage across coil L1, used for reception.

This circuit suffers from the disadvantages mentioned above, these being absence of voltage boosting and inability to use the voltage from coil L1 during sending.

Figure 1:
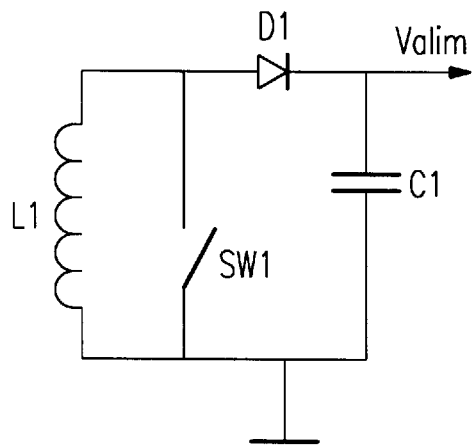
FIG. 1 is a circuit diagram of a known power and modulation circuit.
Figure 2:
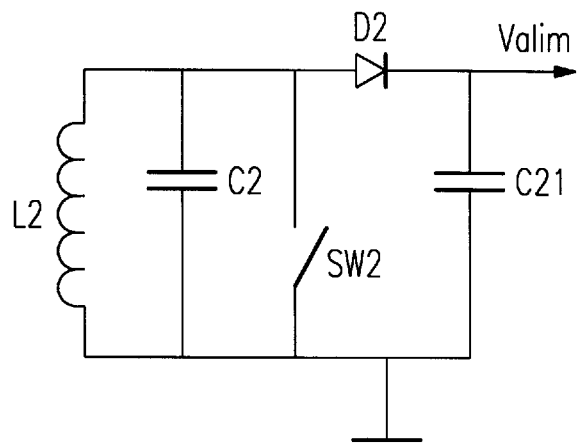
FIG. 2 is a circuit diagram of a known power modulation circuit.

FIG. 2 also shows a circuit diagram of a known power and modulation circuit, such as the one shown in FIG. 1 of EP-A-0,242,906.

This circuit is substantially similar to the one in FIG. 1 except for the fact that coil L1 is replaced by a parallel resonant circuit comprising a coil L2 and a capacitor C2.

Like in FIG. 1, the means for switching transistor SW1, which are powered by voltage Valim, are not shown, nor are the means for evaluating the voltage across coil L2, used for reception.

This circuit suffers from the disadvantages mentioned above, the resonant circuit being easily detuned with a corresponding drop in Q factor, beating between the inductive field frequency and the tuning frequency, difficulties in detecting the current generated by the short circuit during transmission, and the impossibility of exploiting the voltage across coil L2 while the tag is sending.

Coil tuning is particularly problematic in the case of tags: several tags can indeed be present in the area covered by the station's inductor. When the coil of one tag is close to the coil of neighboring tags, its self-inductance increases to a considerable degree, of the order of 100% if two coils are on the same axis.

Using a tuning capacitor in parallel with the coil, as in FIG. 2, boosts the voltage, but the boost is relatively small in a worst case situation, as the proximity of neighboring coils increases self-inductance, thus detuning the circuit.

The invention makes it possible to overcome these problems.

DETAILED DESCRIPTION OF PREFERRED EMBODIMENTS

Figure 3:
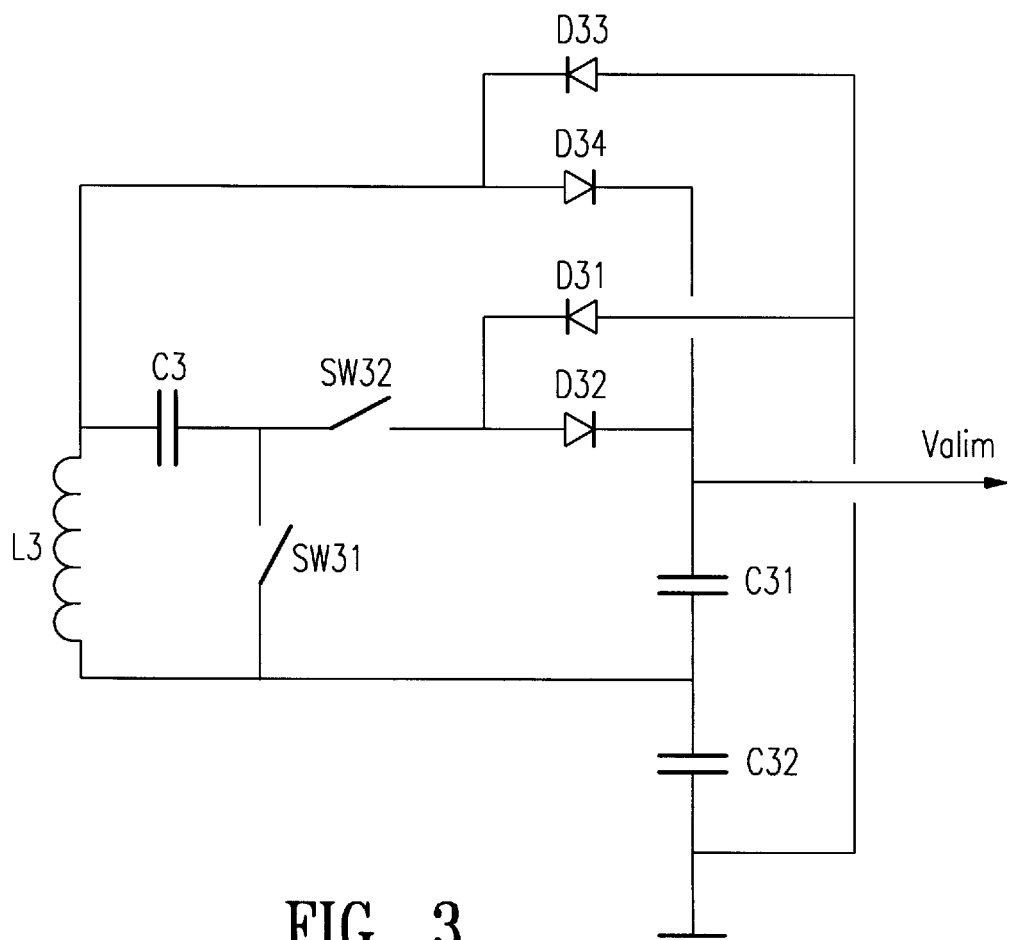
FIG. 3 is a circuit diagram of a power and modulation circuit according to a first embodiment of the invention.

FIG. 3 is a circuit diagram of a power and modulation circuit according to a first embodiment of the invention.

The structure of the circuit in FIG. 3 is the following. A first voltage doubling circuit D31, D32 with two filter capacitors C31 and C32 is connected across a series circuit comprising a coil or inductance L3, a capacitor C3 and switching means SW32 such as a transistor.

Switch means SW31, such as a transistor, are provided for short-circuiting the series resonant circuit formed by coil L3 and capacitor C3.

A second voltage doubling circuit D33, D34, employing the same two filtering capacitors C31 and C32 is connected across coil L3.

A power supply voltage Valim is obtained at the output from diodes D32 and D34. The means for controlling transistors SW31 and SW32 are not shown, nor are the means for evaluating the voltage across L3.

The circuit shown in FIG. 3 operates as follows.

In receive mode, or in remote powering, in other words outside periods of sending or modulation, SW31 is open and SW32 is closed; rectification is performed by voltage doubling circuit D31, D32 with the two filtering capacitors C31, C32.

The current in L3 is now simply proportional to the current sunk by the circuits being powered, and is consequently fairly low.

For sending or modulation, SW32 is opened and SW31 is closed. Circuit L3, C3 now becomes a parallel resonant circuit. There is a sharp increase in coil current, rendering detection easier.

The invention provides the following advantages. Firstly, the impedance of C3 is subtracted from the impedance of L3, furnishing more energy for circuit powering. Use can be made of the boosted voltage across L3 for continuing to power the circuits, via voltage doubler D33, D34 plus the two filtering capacitors C31, C32, during sending.

It is also possible to detect zero crossing points of the voltage across L3 for generating a clock signal able to be used by the logic circuits during sending.

It will also be noted that the provision of a boosted voltage across L3 means that it is not essential to employ a high amplitude inductive field at the station.

The variation in self-inductance resulting from the proximity of other tags has little incidence on the voltage Valim, in normal operation. Additionally, current detection during sending is easier than is the case with the circuit in FIG. 2.

Figure 4:
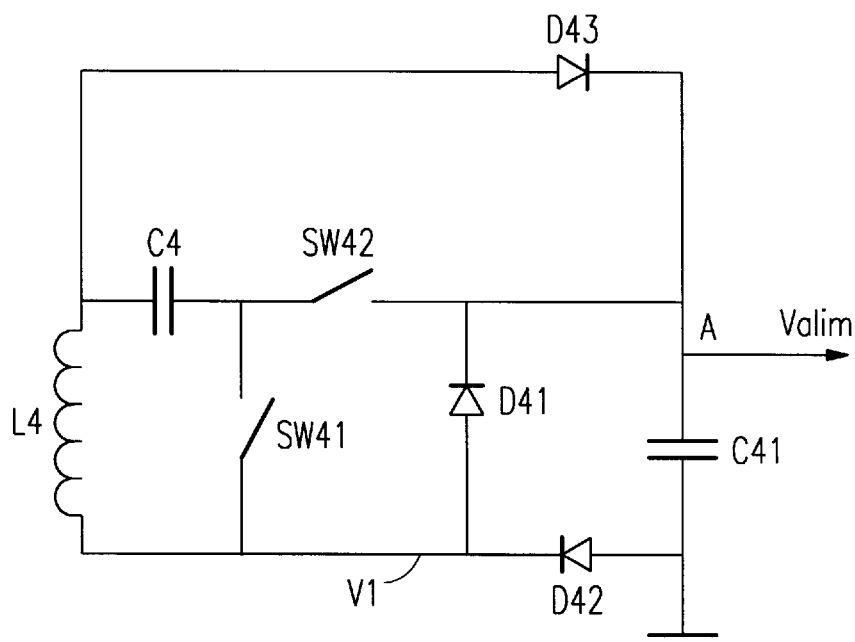
FIG. 4 is a circuit diagram of a power and modulation circuit according to a second embodiment of the invention.

FIG. 4 is a circuit diagram of a power and modulation circuit according to a second embodiment of the invention.

The circuit in FIG. 4 has a unit comprising coil L4, capacitor C4, and two switching means SW41 and SW42, similar to L3, C3, SW31 and SW32 in FIG. 3.

A power supply voltage Valim is obtained at point A at the other end of switch SW42 from capacitor C4. One end of a diode D43 is connected between coil L4 and capacitor C4, the other end being connected to point A; the diode conducts positively from the coil to point A. A capacitor C41 is connected between point A and ground. A diode D41 is connected between point A and the end of coil L4 not connected to capacitor C4, and conducts in the same sense towards point A. A diode D42 is connected between ground and the end of coil L4 not connected to capacitors C4, conducting positively toward said end.

Like the case of FIG. 3, the control means for transistors SW41 and SW42 are not shown, and nor are the means for analysing the voltage across coil L4.

The circuit of FIG. 4 operates as follows.

When the circuit is not sending, SW41 is open, SW42 is closed and the circuit comprising C4, D41, D42 and C41 forms a voltage doubler circuit. Voltage Valim is equal to the peak-to-peak voltage supplied by L4, C4, less the conduction current voltages of diodes D41, D42.

During sending, SW41 is closed, SW42 is open, and L4-C4 becomes a parallel resonant circuit, a boosted voltage appearing across L4 allowing the circuits to be continuously powered, using half-wave rectification via diodes D42, D43 in series.

The advantage of this circuit is that it only requires two capacitors only one of which, C41, is of high value. Additionally, this circuit also provides all the advantages of the circuit in FIG. 3.

Figure 5:
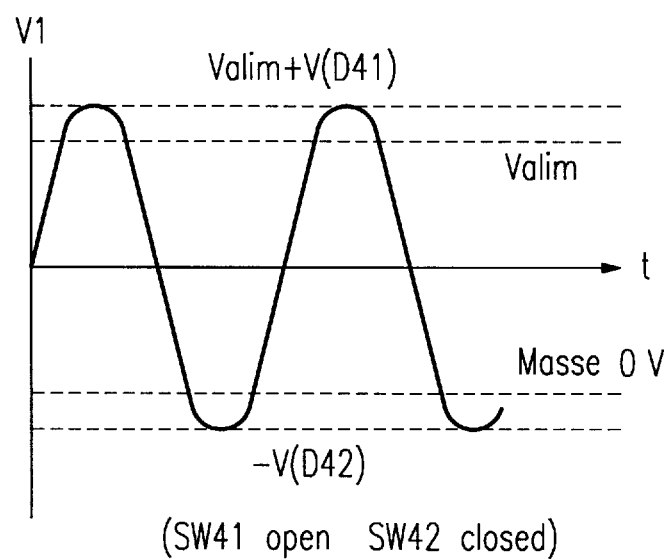
FIG. 5 shows various voltages in the circuit of FIG. 4.

FIG. 5 shows the voltage obtained from the circuit in FIG. 4. The point on FIG. 4 where the voltage shown in FIG. 5 is measured is marked V1, i.e. at the terminal of L4 not connected to capacitor C4, the circuit being in operation, not sending, with SW41 open and SW42 closed.

The peak-to-peak value of V1 is equal to the sum of Valim and the conduction current voltages of diodes D41 and D42.

This invention can advantageously used for implementing the methods described in applicants co-pending applications entitled "Method for remotely interrogating tags, and station and tag implementing said method" and "Phase control method for electronic tags and station and tag implementing said method" which are incorporated herein by reference. Note should particularly be taken of the transmission method in the second of these.

Those skilled in the art can implement the invention based on the circuits in FIGS. 3 and 4 by any conventional means: assembly of discrete components, integrated circuit form, etc.

Obviously, other embodiments of the invention are possible: the switching means can be any suitable semiconductor device. Any suitable equivalent rectifying means can be used in place of the diodes. Any type of coil, depending on the application, can be used for this invention. Finally, the invention can also find other applications apart from remotely-pollable tags.

What is claimed is:

1. A power and modulation circuit, suitable for use in conjunction with a remotely-polled tag, comprising:
   coil means;
   a capacitor, a first terminal of said capacitor is connected to a first terminal of said coil means;
   first switching means provided between a second terminal of said coil means and a second terminal of said capacitor for constituting a parallel LC circuit providing modulation when said first switching means are closed;
   and a circuit for rectifying a voltage in said coil means, for providing a supply voltage, connected to the second terminal of said coil means and to the second terminal of said capacitor.

2. The power and modulation circuit according to claim 1, wherein said rectifying circuit includes second switching means capable of being opened for modulation.

3. The power and modulation circuit according to claim 1 further comprising rectifying means connected across the terminals of said coil means, and active when said first switching means are closed.

4. The power and modulation circuit according to claim 2 further comprising rectifying means connected across the terminals of said coil means, and active when said first switching means are closed.

5. A power and modulation circuit, suitable for use in conjunction with a remotely-pollable tag, comprising:
   coil means for picking up an inductive field and modulating said field;
   means for constituting a series resonant LC circuit with said coil means in the absence of modulation;
   means for constituting a parallel resonant LC circuit with said coil means for modulating said inductive field;
   means for rectifying a voltage induced by said inductive field in said coil means for providing a power supply voltage,
   wherein the series resonant LC circuit and the parallel resonant LC circuit have a same resonant frequency.

6. The power and modulation circuit according to claim 5, wherein said resonant frequency is a frequency of said inductive field.

7. The power and modulation circuit according to claim 5, wherein said means for constituting a series resonant LC circuit and said means for constituting a parallel resonant LC circuit comprise a common capacitor.

8. The power and modulation circuit according to claim 5, wherein the means for rectifying an induced voltage comprise first rectifying means connected across the terminals of said series resonant LC circuit formed by said means for constituting a series resonant LC circuit in the absence of modulation.

9. The power and modulation circuit according to claim 8, wherein said rectifying means comprise a voltage doubler circuit.

10. The power and modulation circuit according to claim 5, wherein the means for rectifying an induced voltage comprise second rectifying means connected across the terminals of said parallel resonant LC circuit formed by the means for constituting a parallel resonant LC circuit for modulating said inductive field.

11. The power and modulation circuit according to claim 10, wherein said rectifying means comprise a voltage doubler circuit.

12. A power and modulation circuit, suitable for use in conjunction with a remotely-pollable tag, comprising:
  coil means for picking up an inductive field and modulating said field;
  means for constituting a series resonant LC circuit with said coil means in the absence of modulation;
  means for constituting a parallel resonant LC circuit with said coil means for modulating said inductive field;
  means for rectifying a voltage induced by said inductive field in said coil means for providing a power supply voltage,
  wherein said means for constituting a series resonant LC circuit and said means force constituting a parallel resonant LC circuit comprise a common capacitor.

13. The power and modulation circuit according to claim 12, wherein the series resonant LC circuit and the parallel resonant LC circuit have a same resonant frequency.

14. The power and modulation circuit according to claim 13, wherein said resonant frequency is a frequency of said inductive field.

15. The power and modulation circuit according to claim 12, wherein the means for rectifying an induced voltage comprise first rectifying means connected across the terminals of said series resonant LC circuit formed by said means for constituting a series resonant LC circuit in the absence of modulation.

16. The power and modulation circuit according to claim 15, wherein said rectifying means comprise a voltage doubler circuit.

17. The power and modulation circuit according to claim 12, wherein the means for rectifying an induced voltage comprise second rectifying means connected across the terminals of said parallel resonant LC circuit formed by the means for constituting a parallel resonant LC circuit for modulating said inductive field.

18. The power and modulation circuit according to claim 17, wherein said rectifying means comprise a voltage doubler circuit.

19. A remotely-pollable tag provided with a power and modulation circuit according to at least one of claims 1–4 and 5–18.

* * * * *